Sept. 2, 1969        G. MARTELLI ET AL     3,464,618
REINFORCED-RIM POCKET PACK OF THIN PLASTIC MATERIAL, FOR
FEW FRUITS OR LIKE ARTICLES
Filed June 25, 1968                               2 Sheets-Sheet 2
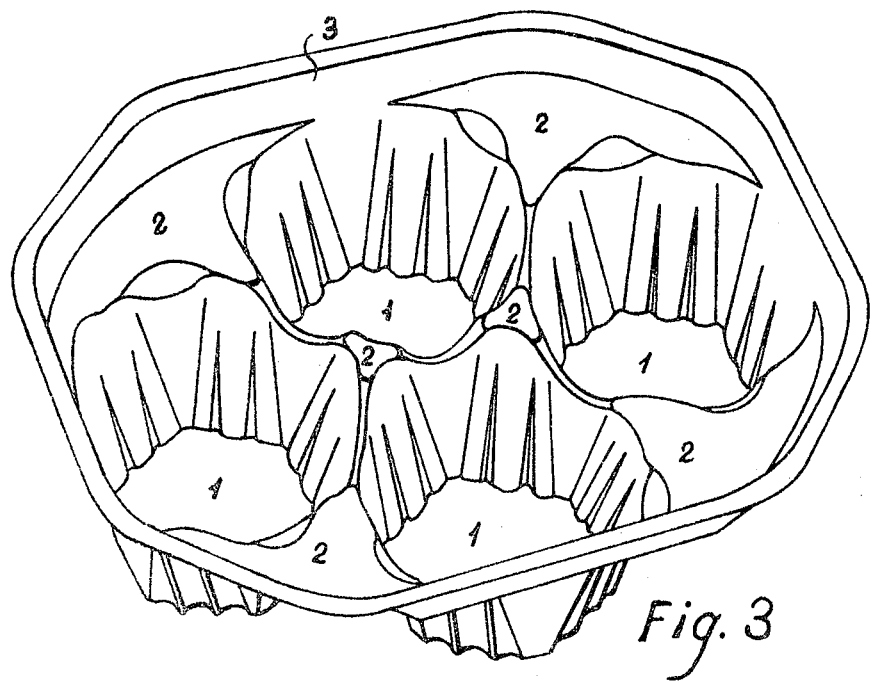
Fig. 3
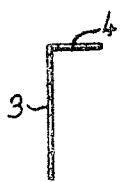 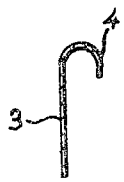 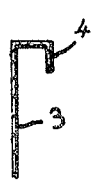 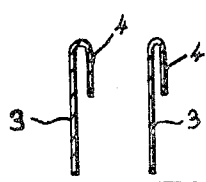
Fig. 4    Fig. 5    Fig. 6    Fig. 7    Fig. 8
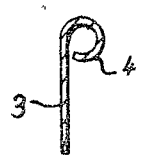      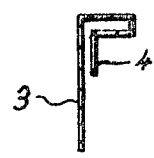
Fig. 9      Fig. 10

3,464,618
REINFORCED-RIM POCKET PACK OF THIN PLASTIC MATERIAL, FOR FEW FRUITS OR LIKE ARTICLES

Guido Martelli, Piazza XX Settembre 5, Nerio Martelli, Via Cavaioni 6, and Francesco Martelli, Piazza XX Settembre 5, all of Bologna, Italy
Filed June 25, 1968, Ser. No. 739,728
Claims priority, application Italy, June 28, 1967, 7,113/67
Int. Cl. B65d 19/02
U.S. Cl. 229—2.5      4 Claims

ABSTRACT OF THE DISCLOSURE

The invention relates to a packaging tray constructed of a synthetic resin material provided with a plurality of pockets, the upper portions of which are integrated into a shelf, the perimeter of which extends upwardly to form an area by which the tray may be readily grasped.

---

The modern sale methods of fruit in supermarkets by the so-called "self-service" method necessitate the use of already parcelled small packages having an approximate constant weight and which contain a limited number of middle-sized fruits (such as apples, oranges or grapefruits) or like articles corresponding to the quantity which is most usually purchased by the average consumer.

Considerable economies can be realized whenever these packages can be packed by the growers and can be used both for the shipment of fruit from the place where grown to the point of consumption and as part-containers for subsequent retail sale. Therefore, the packing units or packs should be such as to enable their being packed by means of the already existing methods and equipment, specifically also by means of known mechanical equipment. Furthermore, during transportation from the place of origin to their point of destination, the packs should guarantee the protection of the fruit as well as their proper condition and should also allow for their aeration. Upon reaching their destination and before being put out for sale, it is generally necessary to check on the condition of the fruits: the packs in question should permit an easy inspection of their contents and also allow ready and quick substitution of any possibly damaged fruit. Finally, these packages should be fit for being easily transported by the retail dealer, either by applying a handle or by conveniently wrapping them up and handing them over to a customer, or by their being chosen directly by the consumer in self-service shops.

The present invention aims at producing packing units or packs which will comply with all the above illustrated requirements, including a supporting function, and which are formed by small trays provided with a series of pockets with the surrounding edge portion adjacent to the pockets being arranged to include a reinforced rim portion which will permit one who desires to pick-up or move a tray to do so merely by grasping the rim portion between the thumb and forefinger of one hand. Of course, it is also contemplated that an appropriate handle can be fastened or applied to the rim portion when desired. Furthermore, preferably the rims extend upwardly a sufficient distance above the tops of the pockets in the trays so as to permit the free housing beneath the rim portion of the upper exposed area of the fruit, which remains outside of the pockets or cells in which they are nested, from contacting adjacent fruit.

Figure 1:
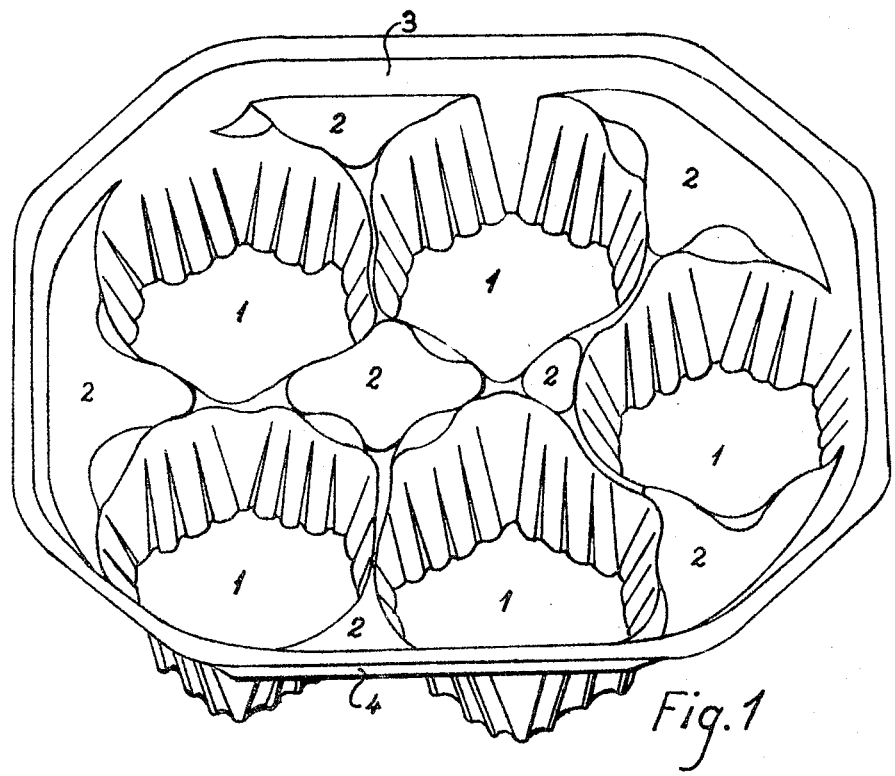
Figure 2:
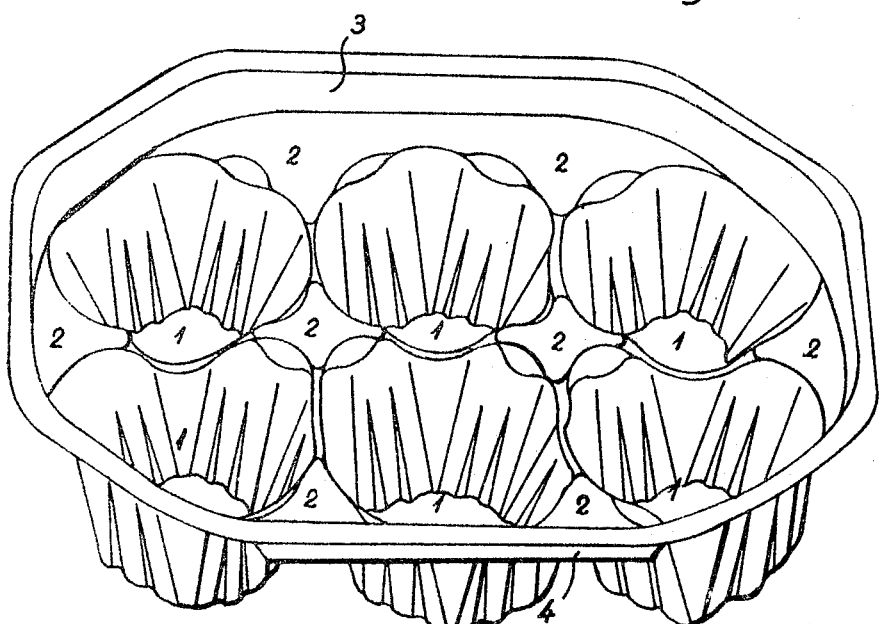

These and other characteristic features of the invention will be apparent from the following specification of some preferred embodiments, shown by way of non-limiting example in the accompanying drawings, wherein:

FIGS. 1, 2 and 3 perspectively show three pocket fruit packs according to the invention, and FIGS. 4 through 10 show in vertical section different profiles of reinforced rims.

With reference to the drawing, the pocket pack according to the invention is preferably constructed of a thin plastic material whose thickness is between 0.10 and 0.50 millimeter depending upon the quality of the plastic material used, the number, the depth, and the form of the pockets and also upon the molding process employed: this container, however, might also be constructed of a material of a greater thickness up to about 2 or 3 millimeters if it is plastic foam.

Each pack presents a limited number of pockets 1. Thus, the pockets are four in the pack shown in FIG. 3, five in FIG. 1, and six in FIG. 2, but may vary from two to eight, depending upon the size of the fruits or like articles to be packed. Anyway, the outer dimensions of the packs should be such as to permit their being grasped by their opposed rim portions between the thumb and the other fingers of one hand and should be possibly of a few standardized sizes, even with the varying number of pockets, in order to render their easy packaging in standard cases or boxes.

Taking all this into account, the pockets 1 can be arranged in the most suitable manner for making the best use of the available pack area.

The pockets are separated at their tops by ridges, which assume the form of frustrum of cones or of pyramids with flat or concave sides at the points where three or four pockets meet the small bases 2 at the top of said frustrum of cones or pyramids forming humps having generally a polygonal shape with non-straight sides.

As distinguished from the conventional large trays containing pockets which are constructed of plastic material, these improved packaging trays have a limited number (usually not over six) of pockets according to the invention which are usually provided with an upwardly projecting rim 3 which will be of sufficient height to permit piling up of a number of packaging trays filled with fruits, at which time the tops of the fruits inserted in any one of the packaging trays do not touch the bottom portion of the pockets of the superposed pack, but instead each adjacent tray will be supported by the rim of the next tray.

Furthermore, the rim edges 4 are reinforced or stiffened in any suitable manner, and preferably by bending or curling as clearly shown by way of example in FIGS. 4 through 10.

Of course, it is contemplated that the invention may undergo numerous changes, particularly with regard to the overall shape of the packaging trays as well as the configuration of the pockets therein and the method of reinforcing the rim portions thereof.

What is claimed is:
1. A packaging tray for fragile articles such as fruit and the like comprising a film of synthetic resin, a plurality of flexible, cup-like pockets each having bottom and side walls formed in said film, said side walls tapering upwardly and outwardly and terminating in a hori- zontal shelf portion having an upstanding rim area, said pockets further including a smooth flowing undulatory area communicating with said shelf portion, and said side wall being further crimped to provide curved rib portions.

2. A packaging tray for fragile articles as in claim 1, wherein the upstanding rim extends substantially above the pockets formed in said tray so that superposed filled trays may be packaged one upon another without damaging the articles contained in an adjacent tray.

3. A packaging tray for fragile articles as in claim 1, wherein the upstanding rim area is further stiffened at the terminal area thereof to provide rigidity for grasping of the tray by hand.

4. A packaging tray for fragile articles as in claim 3, wherein the terminal area of the stiffened rim is deformed to further increase the strength thereof.

References Cited

UNITED STATES PATENTS

| | | |
|---|---|---|
| 3,074,582 | 1/1963 | Martelli et al. |
| 3,121,507 | 2/1964 | Weiss _____ 229—2.5 X |
| 3,262,786 | 7/1966 | Weiss _____ 206—65 X |

DAVID M. BOCKENEK, Primary Examiner

U.S. Cl. X.R.

217—26.5; 220—23.8